(12) United States Patent
Hobmeyr

(10) Patent No.: US 7,709,125 B2
(45) Date of Patent: May 4, 2010

(54) VEHICLE PLUMBING TO RELEASE HYDROGEN FROM FLUID

(75) Inventor: Ralph Hobmeyr, Mainz-Kastel (DE)

(73) Assignee: GM Global Technology Operations, Inc.

( * ) Notice: Subject to any disclaimer, the term of this patent is extended or adjusted under 35 U.S.C. 154(b) by 1894 days.

(21) Appl. No.: 10/717,356

(22) Filed: Nov. 19, 2003

(65) Prior Publication Data

US 2005/0106438 A1 May 19, 2005

(51) Int. Cl.
*H01M 8/04* (2006.01)
(52) U.S. Cl. .......................................... 429/34; 429/38
(58) Field of Classification Search .................... 429/12, 429/13, 30, 34, 39, 38
See application file for complete search history.

(56) References Cited

U.S. PATENT DOCUMENTS

| 4,945,010 A * | 7/1990 | Kaufman et al. ............... 429/26 |
| 6,919,062 B1 * | 7/2005 | Vasileiadis et al. ........ 423/437.1 |
| 2003/0159354 A1 * | 8/2003 | Edlund et al. ............... 48/127.9 |
| 2004/0157099 A1 * | 8/2004 | Kato et al. .................... 429/26 |

\* cited by examiner

*Primary Examiner*—Patrick Ryan
*Assistant Examiner*—Monique Wills
(74) *Attorney, Agent, or Firm*—Harness, Dickey & Pierce, P.L.C.

(57) ABSTRACT

A fuel cell system having a cooling fluid flowing therethrough includes a fuel cell stack in heat transfer communication with the cooling fluid and a conduit through which the cooling fluid flows. The conduit includes a first layer of hydrogen-permeable material. Hydrogen within the cooling fluid permeates through the first layer of hydrogen-permeable material to reduce a hydrogen content of the cooling fluid.

8 Claims, 4 Drawing Sheets

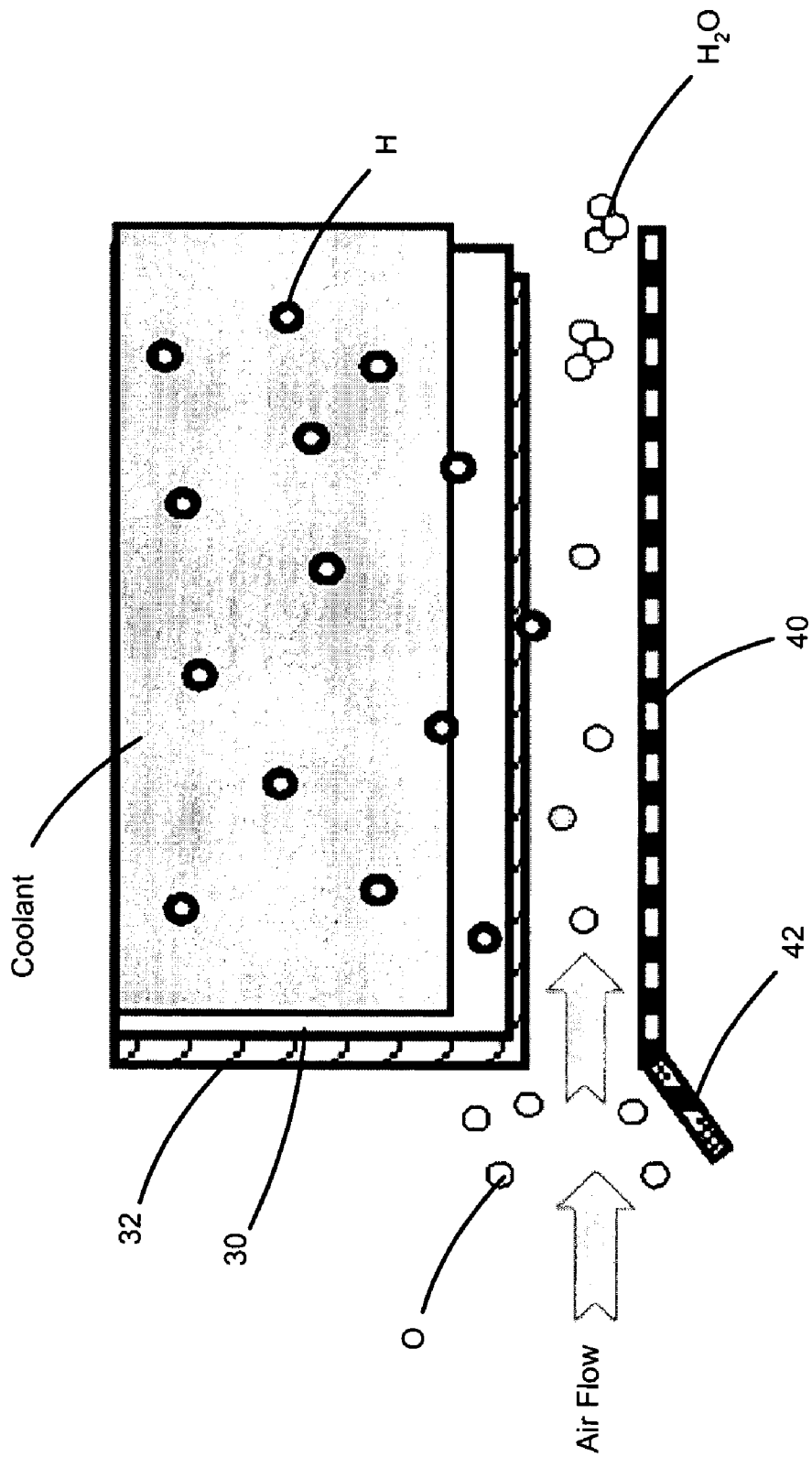

VEHICLE PLUMBING TO RELEASE HYDROGEN FROM FLUID

FIELD OF THE INVENTION

The present invention relates to fuel cell systems, and more particularly to releasing hydrogen from a fluid within the fuel cell system.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell stack to provide the proper operating conditions.

The fuel cell system includes a cooling system that maintains the fuel cell stack at a desired operating temperature. Generally, this temperature is approximately 80° C. The cooling system is in fluid communication with the fuel cell stack and typically includes a coolant reservoir, a pump and a heat exchanger. Coolant from the reservoir is circulated through the fuel cell stack by the pump. The warm coolant exiting the fuel cell stack flows through the heat exchanger, which enables heat dissipation to atmosphere to cool the coolant. The coolant flows back into the reservoir and is again circulated through the cooling system.

As the coolant flows through the fuel cell stack, it is in heat exchange relationship with the components of the fuel cell stack. In this manner, the coolant draws heat from the warmer components to regulate the temperature of the fuel cell stack. In some instances, the coolant is separated from the hydrogen-based feed gas flowing through the fuel cell stack by gaskets. The gaskets within the fuel cell stack do not provide a complete seal. As a result, hydrogen leakage can occur, whereby hydrogen leaks into the coolant. Additionally, hydrogen leaks can occur in other areas of the fuel cell system increasing the hydrogen content of the coolant. Eventually, the hydrogen content of the coolant achieves an undesirable level.

SUMMARY OF THE INVENTION

Accordingly, the present invention provides a fuel cell system having a cooling fluid flowing therethrough. The fuel cell system includes a fuel cell stack in heat transfer communication with the cooling fluid and a conduit through which the cooling fluid flows. The conduit includes a first layer of hydrogen-permeable material. Hydrogen within the cooling fluid permeates through the first layer of hydrogen-permeable material to reduce a hydrogen content of the cooling fluid.

In one feature, the conduit further includes a support layer disposed concentric to the first layer of hydrogen-permeable material. The support layer is breathable to enable passage of the hydrogen to atmosphere. The support layer includes a mesh through which the hydrogen permeates.

In another feature, the conduit further includes a second layer of hydrogen-permeable material disposed about the first layer of hydrogen-permeable material. A support layer is disposed between the first and second layers of hydrogen permeable material.

In still another feature, the conduit further includes a fluid-permeable protective layer disposed about the conduit, protecting the conduit from impact with debris.

In yet another feature, the conduit further includes a hydrogen-permeable layer having a partial catalyst coating to induce a reaction between the hydrogen and oxygen to produce water.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a cross-sectional view of a length of the two-layer plumbing mounted outside of a vehicle.

DETAILED DESCRIPTION OF THE PREFERRED EMBODIMENTS

The following description of the preferred embodiments is merely exemplary in nature and is in no way intended to limit the invention, its application, or uses.

Figure 1:
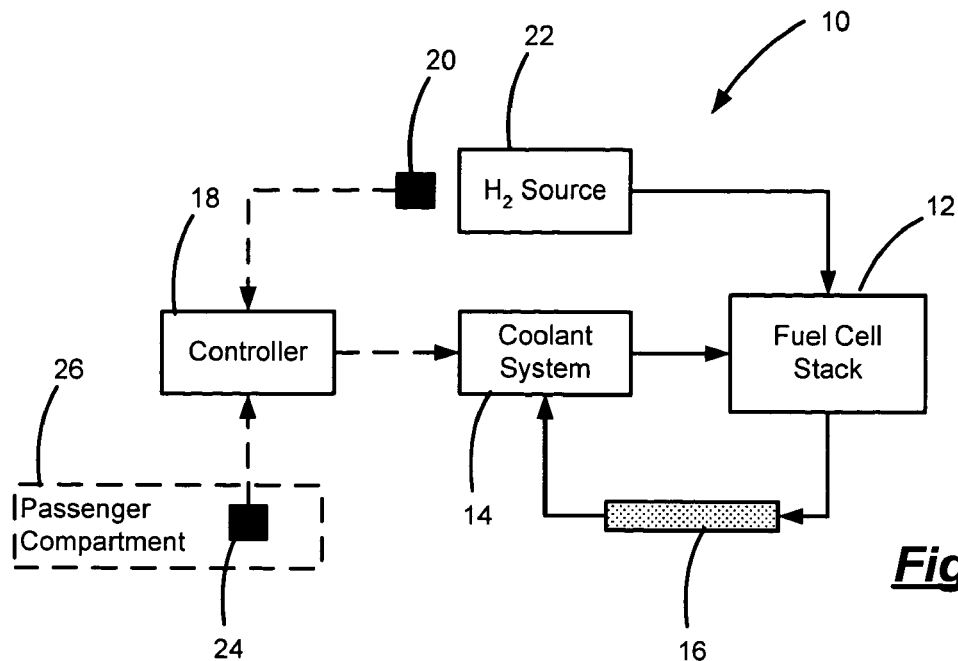
FIG. 1 is a schematic illustration of a fuel cell system including hydrogen releasing plumbing according to the present invention.

Referring now to FIG. 1, a fuel cell system 10 includes a fuel cell stack 12. A solid-polymer-electrolyte fuel cell within the stack includes a membrane that is sandwiched between an anode and a cathode. To produce electricity through an electrochemical reaction, hydrogen ($H_2$), is supplied to the anode side of the fuel cell and an oxidant, such as oxygen ($O_2$), is supplied to the cathode side of the fuel cell. The source of the oxygen is commonly air. In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (e.g., batteries, an electric motor, electrical accessories) that is connected across the membrane. In a second half-cell reaction, oxygen ($O_2$) at the cathode reacts with protons ($H^+$), and electrons ($e^-$) are taken up to form water ($H_2O$).

The fuel cell system 10 further includes a coolant system 14 that circulates coolant through the fuel cell stack 12 and a hydrogen-permeable conduit (HPC) 16 according to the present invention. Although not shown, the coolant system 14 includes a heat exchanger, coolant reservoir and a pump that circulates the coolant through the fuel cell stack 12 and HPC 16. Although the HPC 16 is shown as a return conduit from the fuel cell stack 12, it is anticipated that the HPC 16 can be disposed anywhere along the coolant circulation path. In the event that hydrogen leaks into the coolant as it flows through the fuel cell stack 12, the HPC 16 enables the release of hydrogen from the coolant to reduce the hydrogen content of the coolant. It is preferred, however, that the HPC 16 is disposed remotely from the passenger compartment and not underneath the hood.

The fuel cell system 10 further includes a controller 18 that controls overall operation of the fuel cell system 10. The controller 18 communicates with the coolant system 14 to control the coolant flow through the fuel cell stack 12. The controller 18 also communicates with a hydrogen sensor 20 disposed near a hydrogen source 22 and a hydrogen sensor 24 disposed within a passenger compartment 26. The hydrogen sensors 20,24 detect a hydrogen-content of the atmosphere within their surroundings. If the hydrogen-content exceeds a threshold level, the hydrogen sensors 20,24 generate a signal and the controller 18 alerts a vehicle occupant to the situation. For example, in the event of a hydrogen leak from the hydrogen source 22, the hydrogen sensor 20 would generate a signal. In the event of hydrogen seepage into the passenger compartment 26, the hydrogen sensor 24 would generate a signal.

As discussed in further detail below, the HPC 16 is preferably disposed remotely from either of the hydrogen sensors 20,24. The HPC 16 increases the hydrogen-content of the atmosphere immediately surrounding it as a result of hydrogen permeation therefrom. Therefore, the HPC 16 is preferably located in an area having air flow therearound. For example, the HPC 16 is preferably located below or somewhere on the outside of the vehicle where high velocity, turbulent air streams occur. It is also preferred that the HPC 16 be located in the vicinity of the coolant system 14 or fuel cell stack 12 to reduce the amount of coolant plumbing and thus, the distance the coolant must flow through.

Figure 2:
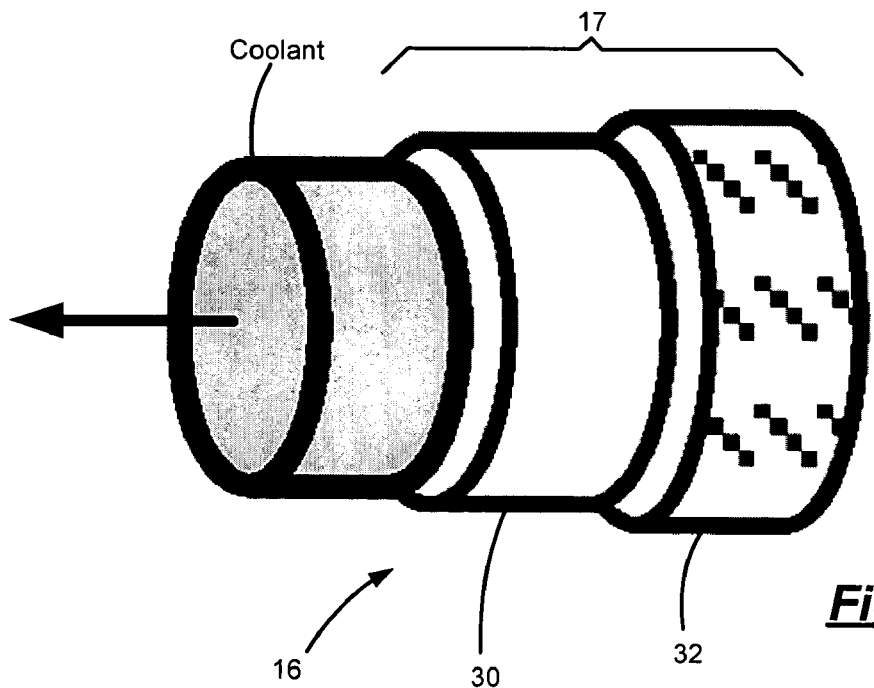
FIG. 2 is a perspective view of a portion of the plumbing including two-layers.

Referring now to FIG. 2, the HPC 16 is illustrated. The HPC 16 includes a layer of hydrogen-permeable material in the form of a tube 30. Although the tube 30 is illustrated to have a circular cross-section, it is anticipated that the tube 30 can have other cross-sections including, but not limited to, square, rectangular or oval. As discussed in further detail below, the hydrogen-permeable material tube 30 tends to be soft and flexible. Therefore, a support layer 32 is included and is disposed concentrically about the hydrogen-permeable tube 30.

The support layer 32 preferably includes a semi-rigid material that is breathable. Such a material can include a metal mesh, plastic mesh, fiberglass mesh or the like. The support layer not only prevents flexing of the HPC 16 but also prevents the hydrogen-permeable tube 30 from rupturing under pressurized fluid flow. If the HPC 16 is disposed in an environment where it is prone to contact with debris (e.g., outside a moving vehicle), the support layer 32 also functions as a protective layer, protecting the soft hydrogen-permeable tube 30 from impact with the debris.

Figure 3:
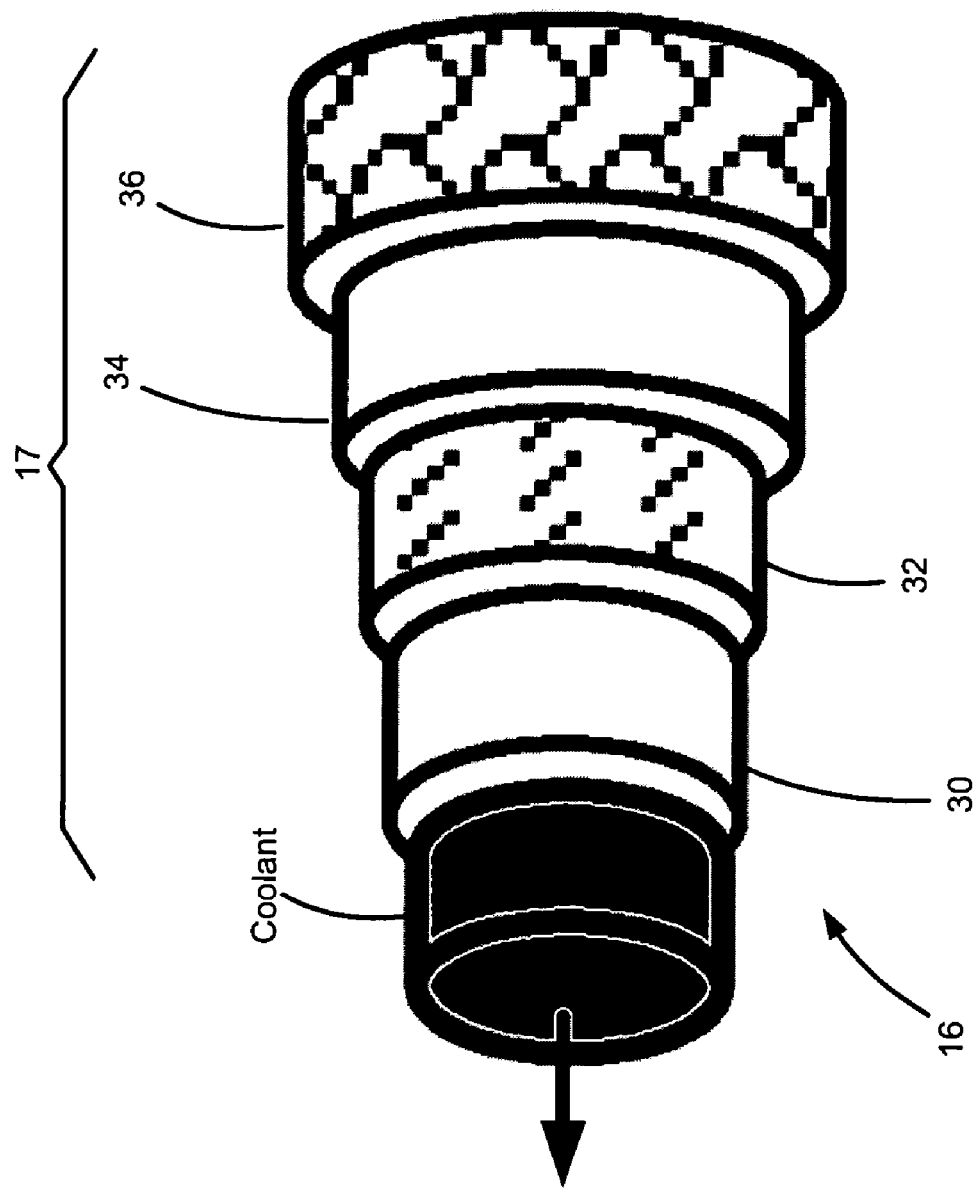
FIG. 3 is a perspective view of a portion of the plumbing including four-layers

Referring now to FIG. 3, the HPC 16 is shown to further include a second layer of hydrogen-permeable material in the form of a tube 34 disposed about the support layer 32. A second support layer 36 is also included and is disposed about the second hydrogen-permeable tube 34. The second support layer 36 preferably includes a semi-rigid material that is breathable. Such a material can include a metal mesh, plastic mesh, fiberglass mesh or the like. As similarly described above, with respect to the support layer 32, the second support layer 36 also functions as a protective layer, protecting the soft hydrogen-permeable tubes 30,34 from impact with the debris and to prevent the hydrogen-permeable tubes 30,34 from rupturing under pressurized fluid flow. In this manner, the second support layer 36 provides a more robust design.

Further, the second support layer 36 adds another degree of protection, protecting the hydrogen-permeable tubes 30,34 from damage due to debris.

It is anticipated that either the first or second support layers 32,36 can include a catalyst coating that promotes a reaction between hydrogen and oxygen. In the case of a single support layer, the support layer 32 includes the catalyst coating. In the case of multiple support layers, the second support layer 36 includes the catalyst coating. The HPC 16 is placed in ambient air that contains oxygen. As hydrogen permeates through the support layer 32,36, the catalyst coating promotes water production using hydrogen and oxygen molecules. The oxygen molecules are contained in the air surrounding the HPC 16.

The hydrogen-permeable material of the tubes 30,34 can be one of several types of known hydrogen-permeable materials. The particular material is selected based on the amount of hydrogen to be released from the coolant. The hydrogen content of the coolant is based on the particular hydrogen leakage characteristics of the fuel cell stack 12. The material and tube dimensions are selected to maintain the hydrogen-content of the coolant at an acceptable level.

Figure 4:
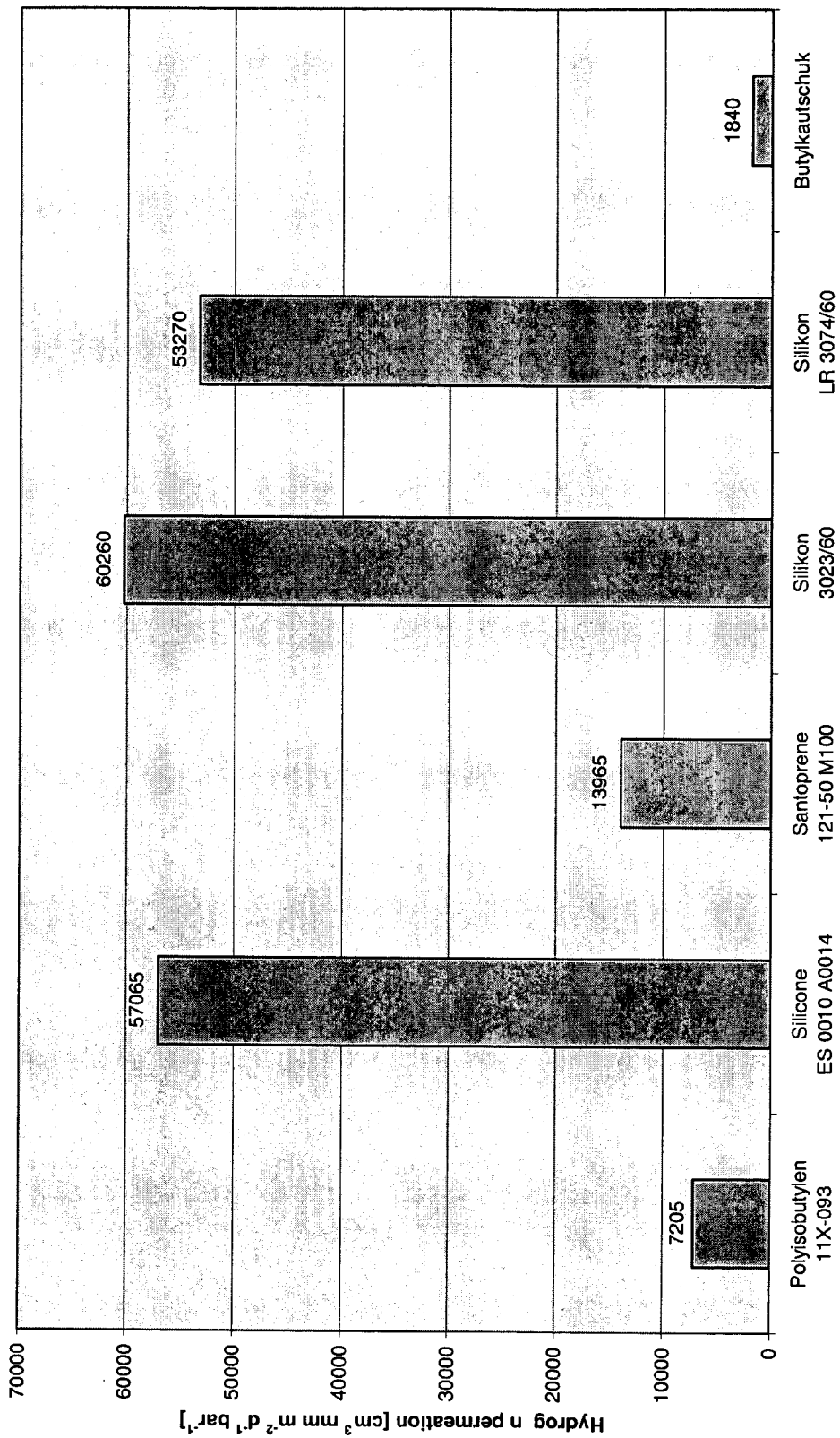
FIG. 4 is a graph comparing the hydrogen permeability of various elastomers.

Referring now to FIG. 4, a graph illustrates the hydrogen permeation characteristics of several exemplary materials. These materials include polyisobutylene (11X-093), silicone (ES 0010 A0014), santoprene (121-50 M100), silicone (3023/60), silicone (LR 3074/60) and butylkautschuk. As graphically illustrated, the silicone rubbers have the highest permeation rates of the exemplary materials and butylkautschuk has the lowest permeation rate of the selected materials. In the case of a fuel cell stack 12 having increased hydrogen leakage characteristics, a high hydrogen-permeable material is preferred. It is appreciated, however, that the materials presented here are merely exemplary in nature and are not exhaustive of the materials available to produce the HPC 16.

Besides the material type, there are other factors that influence the hydrogen permeation rate through the tube 30,34. More particularly, the length of the tube, the inside diameter of the tube, the wall thickness of the tube (i.e., the difference between the outside diameter and inside diameter of the tube) and the tube temperature all influence the amount of hydrogen that is released through the HPC 16. In general, the more surface area of the hydrogen-permeable exposed to the coolant, the higher the rate of hydrogen permeation through the tube. Increased surface area can be achieved by increasing the length of the hydrogen-permeable tube or the diameter of the hydrogen-permeable tube. Additionally, a thicker tube wall decreases the rate of hydrogen-permeation through the tube.

Given a material type, inside diameter and wall thickness, the length of tube required to release a particular volume of hydrogen from the coolant can be determined. By way of example, suppose the fuel cell system 10 must release 30 cm$^3$ of hydrogen per hour through a silicone-based HPC 16 having a hydrogen-permeable tube with a 3.8 cm outside diameter and a 3 mm wall thickness. Using an exemplary temperature of 55° C., the HPC 16 must be at least 55 cm long.

Referring now to FIG. 5, the HPC 16 of FIG. 2 is shown having air flow thereabout. A protective shield 40 is also include to prevent debris from impacting the HPC 16. The protective shield 40 includes a trumpet 42 formed on an end to direct air flow across the HPC 16. Hydrogen molecules are illustrated and permeate through the HPC 16. The air flow about the HPC 16 includes oxygen molecules. It is anticipated that the air flow, generated by vehicle motion or another source such as a blower, carries the hydrogen molecules away from the fuel cell system 10. If the support layer 32 includes a catalyst, as described above, a reaction can be induced, whereby the hydrogen molecules combine with the oxygen molecules to produce water molecules.

The present invention is implemented to remove unwanted substances or contaminants from a fluid to reduce a contaminant-content of the fluid. In the present embodiment, the HPC 16 enables permeation of hydrogen from coolant to reduce a hydrogen content of the coolant. The HPC 16 performs this function without requiring additional energy from the power sources and operates 24 hours a day, whether the vehicle is in operation. Further, the HPC 16 is a mechanical structure that includes no moving parts, which could be defective or become stuck. Additionally, the HPC 16 and function thereof need not be regulated by the controller 18 or a control scheme.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system having a cooling fluid flowing therethrough, comprising:
    a fuel cell stack including a plurality of proton exchange membranes each having an anode side and a cathode side and a plurality of coolant passages extending between adjacent ones of said plurality of proton exchange membranes; and
    a conduit in fluid communication with said coolant passages and through which said cooling fluid flows and comprising a first layer of hydrogen-permeable material, wherein hydrogen within said cooling fluid permeates through said first layer of hydrogen-permeable material to reduce a hydrogen content of said cooling fluid.

2. The fuel cell system of claim 1 further comprising a support layer disposed concentric to said first layer of hydrogen-permeable material.

3. The fuel cell system of claim 2 wherein said support layer is breathable to enable passage of said hydrogen to atmosphere.

4. The fuel cell system of claim 2 wherein said support layer includes a mesh through which said hydrogen permeates.

5. The fuel cell system of claim 1 further comprising a second layer of hydrogen-permeable material disposed about said first layer of hydrogen-permeable material.

6. The fuel cell system of claim 5 further comprising a support layer disposed between said first and second layers of hydrogen permeable material.

7. The fuel cell system of claim 1 further comprising a fluid-permeable protective layer disposed about said conduit, protecting said conduit from impact with debris.

8. The fuel cell system of claim 1 further comprising a hydrogen-permeable layer having a partial catalyst coating to induce a reaction between said hydrogen and oxygen to produce water.

* * * * *